United States Patent
Deane

(10) Patent No.: US 6,795,133 B2
(45) Date of Patent: Sep. 21, 2004

(54) HIGHER AND LOWER DEFINITION PATTERNING OF AN ACTIVE PLATE

(75) Inventor: Steven C. Deane, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 56 days.

(21) Appl. No.: 10/151,048

(22) Filed: May 20, 2002

(65) Prior Publication Data

US 2002/0191123 A1 Dec. 19, 2002

(30) Foreign Application Priority Data

May 23, 2001 (GB) .............................................. 0112561

(51) Int. Cl.⁷ .......................................... G02F 1/1343
(52) U.S. Cl. ........................................ 349/39; 349/187
(58) Field of Search ............................. 349/39, 46, 187

(56) References Cited

U.S. PATENT DOCUMENTS

| | | | | |
|---|---|---|---|---|
| 5,151,806 A | * | 9/1992 | Kawamoto et al. | ........... 349/39 |
| 5,173,792 A | * | 12/1992 | Matsueda | ..................... 349/54 |
| 5,276,540 A | * | 1/1994 | Okamoto et al. | ............. 349/39 |
| 5,598,285 A | * | 1/1997 | Kondo et al. | ................. 349/39 |
| 6,052,162 A | | 4/2000 | Shimada et al. | .............. 349/38 |
| 6,433,764 B1 | * | 8/2002 | Hebiguchi et al. | ............ 345/87 |
| 6,603,525 B2 | * | 8/2003 | Yamakita et al. | ........... 349/139 |
| 6,686,229 B2 | * | 2/2004 | Deane et al. | ............... 438/151 |

* cited by examiner

Primary Examiner—Robert H. Kim
Assistant Examiner—Andrew Schechter

(57) ABSTRACT

The storage capacitor of an active matrix liquid crystal display is formed to have a second electrode 28 with a plurality of fingers 50 extending over the first electrode 10. The drain electrode 30 and the second electrode 28 of the storage capacitor may be formed from a single metallization layer. The width of the drain electrode 30 and the fingers 50 of the second electrode 10 will tend to vary in parallel as a result of any process variation in the manufacturing process. The feature that the widths vary in parallel tends to cancel out variation in the kick back voltage.

12 Claims, 4 Drawing Sheets

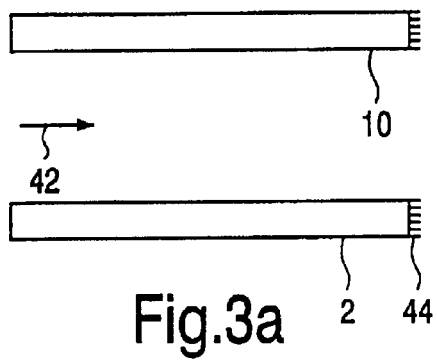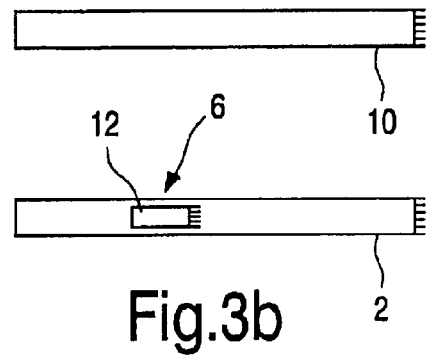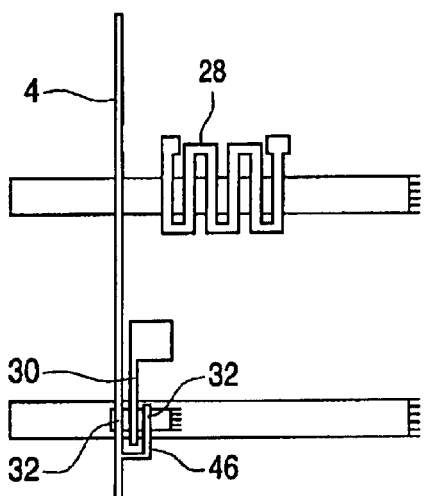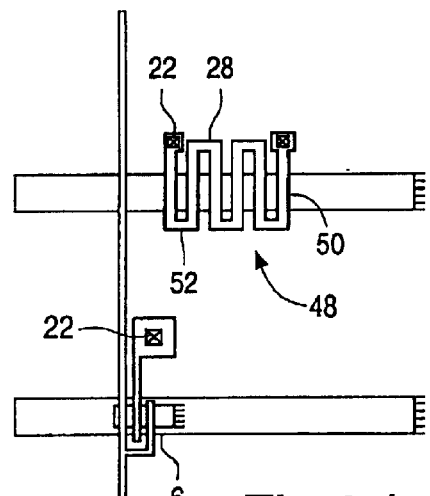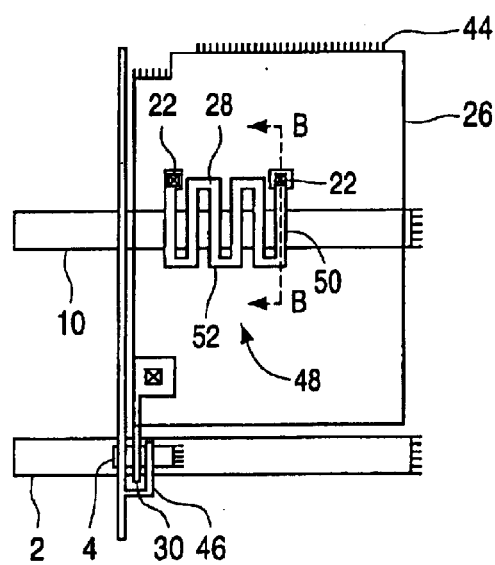

HIGHER AND LOWER DEFINITION PATTERNING OF AN ACTIVE PLATE

The application relates to an active plate including a storage capacitor and to a method of making the active plate, and in particular to a storage capacitor, pixel structure and method for making an active plate as used for example in an active matrix liquid crystal display.

Active matrix liquid crystal displays (AMLCDs) are widely used for providing high quality displays in a number of applications, for example laptop personal computers. In such active matrix liquid crystal displays, transistors corresponding to individual pixel electrodes are used to drive the liquid crystal display. The transistors are generally thin film transistors (TFTs).

Conventionally, active matrix liquid crystal displays include an active plate carrying the active pixel electrodes and corresponding TFT drive transistors and an opposed passive plate supporting a counter electrode, with liquid crystal sandwiched between the active and passive plates.

A conventional active plate of an AMLCD is illustrated in top view in FIG. 1 and in section along A—A in FIG. 2. The active plate is formed on a substantially flat substrate 1. Row electrodes 2 and column electrodes 4 extend across the active plate in substantially perpendicular directions. Gate electrodes 6 extend off the row electrodes 2 to form the bottom gate of each pixel element. Insulating regions 8 separate the row and column electrodes. Capacitor electrodes 10 likewise extend across the active matrix, parallel to the row electrodes.

An insulating layer 16 is formed over the gate electrode to form the gate insulating layer and over the capacitor electrode to form the capacitor dielectric. A semiconductor region 12 is formed over the insulating layer 16. The semiconductor region includes a lower undoped amorphous silicon layer 14 extending from a source region 34 to a drain region 36 over the gate insulating layer 16 and highly doped contact regions 18 at the source and drain regions 34,36. A source contact 32 connects to the source region 34 and a drain contact 30 connects to the drain region 36. A spur 24 extends from the column electrode 4 to connect to the source contact 32.

The semiconductor region 12, gate electrode 6, insulating layer 16 and source and drain contacts 18 form a thin film transistor (TFT) structure.

The TFT structure is covered by an insulating layer 20. A via hole 22 connects through this insulating layer to the drain contact 30. A transparent pixel electrode 26, generally formed of indium tin oxide, connects to the drain contact 30 through the via hole 22.

A storage capacitor is formed between the pixel electrode 26 and the capacitance line 10. To this end, a top capacitor electrode 28 is formed in each pixel above the insulating layer 16 over the storage capacitor electrode 10. The pixel electrode 26 connects to the top capacitor electrode 28 through a via hole 22.

The single pixel electrode and TFT structure described above is repeated across the substrate 1 to define a matrix of pixels.

Typical processes for making arrays of pixel electrodes to form active plates use photolithography and etching to pattern the various layers used to make up the structure. Many processes employ five mask layers, although some processes have been proposed using only four mask layers. The need to deposit material layers, define photoresist on each layer and then etch or develop away as much as 95% of each material layer limits possible cost savings.

Moreover, photolithography is a high cost process which uses tools with a high capital cost, limited throughput and which consumes large quantities of costly photoresist and developer.

Accordingly, there have been proposals to use lower cost lower resolution patterning processes to fabricate active matrix plates. For example, printing processes have been proposed. Unfortunately, printing processes have poor resolution and alignment accuracy compared with conventional photolithography. Moreover, printing processes such as gravure offset tend to leave hairs or tails on materials extending out from the trailing edges of features. These hairs or tails can cause short circuits. Accordingly, it is very difficult to manufacture active plates using printing technologies.

There is thus a need for a method of manufacturing active plates using lower resolution processes, and for a corresponding design of active plates.

According to the invention there is provided an active plate comprising a substrate; a first metallisation layer defining gate electrodes and first storage capacitor electrodes extending longitudinally across the substrate; a second metallisation layer defining source and drain electrodes and second storage capacitor electrodes; a semiconductor body layer forming thin film transistor bodies between the source and drain electrodes; and an insulation layer between first and second storage capacitor electrodes; wherein the second electrode is formed from a plurality of fingers extending across the first electrode.

An important factor in active matrix liquid crystal display performance is the kick back voltage. This is proportional to the parasitic gate pixel capacitance in the switching TFT divided by the total pixel capacitance. Some process variations can cause the TFT parasitic capacitance to vary, and hence the kickback voltage to vary also. This is a particular problem with arrangements which use lower definition patterning processes such as printing, although the problem applies to some extent in all active matrix liquid crystal displays.

This variation in voltage does not just occur in AMLCDs, but also in other structures that use an active plate with TFTs and storage capacitors. One example of such a structure is an X-ray detector of the type having an array of addressed elements and storage capacitors.

In the active plate according to the invention, an increase in width of the drain electrode will tend to be matched by an increase in width of the fingers, since both are formed in the second metallisation layer and patterned using the same process. When used in an active matrix structure the kick back voltage, which is dependent on the ratio of these two quantities, will accordingly be much less dependent on variability in the patterning process used to define the drain electrode and the fingers capacitor electrode.

The plurality of fingers may be electrically connected together by at least one longitudinal element formed in the second metallisation layer, by separately connecting each finger to the pixel electrode through respective vias, or otherwise.

The width of the fingers may be from half to double the width of the drain electrode, for effective cancellation, preferably from 0.8 times to 1.2 times.

The active plate may incorporate features to permit one or more layers to be formed from a lower definition patterning process. For example, the semiconductor body may extend longitudinally over the gate electrode, so that any hairs or tails extending from the semiconductor body will remain over the gate electrode without significantly affecting the structure.

The drain electrode may extend across the full width of the semiconductor body and the gate electrode. This simple arrangement makes it easier for the semiconductor body and gate electrode to be formed in a lower resolution process. Moreover, when combined with a second electrode overlapping the edges of the first electrode, the kick back voltage may be less sensitive to variation in the width of a metallisation layer forming the first storage capacitor electrode and the gate electrode of a TFT.

In order to combine the plurality of fingers and the overlapping electrodes, embodiments of the invention form the second electrode from a plurality of fingers extending laterally across the full width of the first electrode.

The gate electrodes may extend longitudinally across the substrate with substantially constant width.

The active plate may be incorporated in a liquid crystal display having liquid crystal between active and passive plates.

The invention also relates to a method of manufacture of an active plate, comprising the steps of: depositing and patterning using a lower definition patterning process a first metallisation layer on a substrate, the first metallisation layer defining gate electrodes and first storage capacitor electrodes extending longitudinally across the substrate; depositing an insulation layer; depositing and patterning using a lower definition patterning process a semiconductor body layer forming thin film transistor bodies; and depositing and patterning using a higher definition process a second metallisation layer defining source and drain electrodes and second storage capacitor electrodes, wherein the second storage capacitor electrode is patterned to have a plurality of separate fingers extending across the substrate.

The overlapping second storage capacitor electrode reduces adverse effects from the use of lower definition processes used to pattern some of the layers, especially the first metallisation layer. In particular, the device thus manufactured may exhibit a lower variation in kick back voltage than would otherwise be the case.

In embodiments, the higher definition process may be photolithography and the lower definition process may be printing.

The drain electrode may extend across the width of the gate electrode.

Specific embodiments of the invention will now be described, purely by way of example, with reference to the accompanying drawings, in which:

FIGS. 3a to 3e illustrate in top view the manufacturing steps for making an active plate according to an embodiment of the invention.

FIG. 3 illustrates, in top schematic view, the steps of an exemplary method of manufacturing a thin-film device according to the invention, and FIG. 4 illustrates the thin film device thus made, in section through B—B. In the example, the device is an active plate of an active matrix liquid crystal display.

Figure 1:
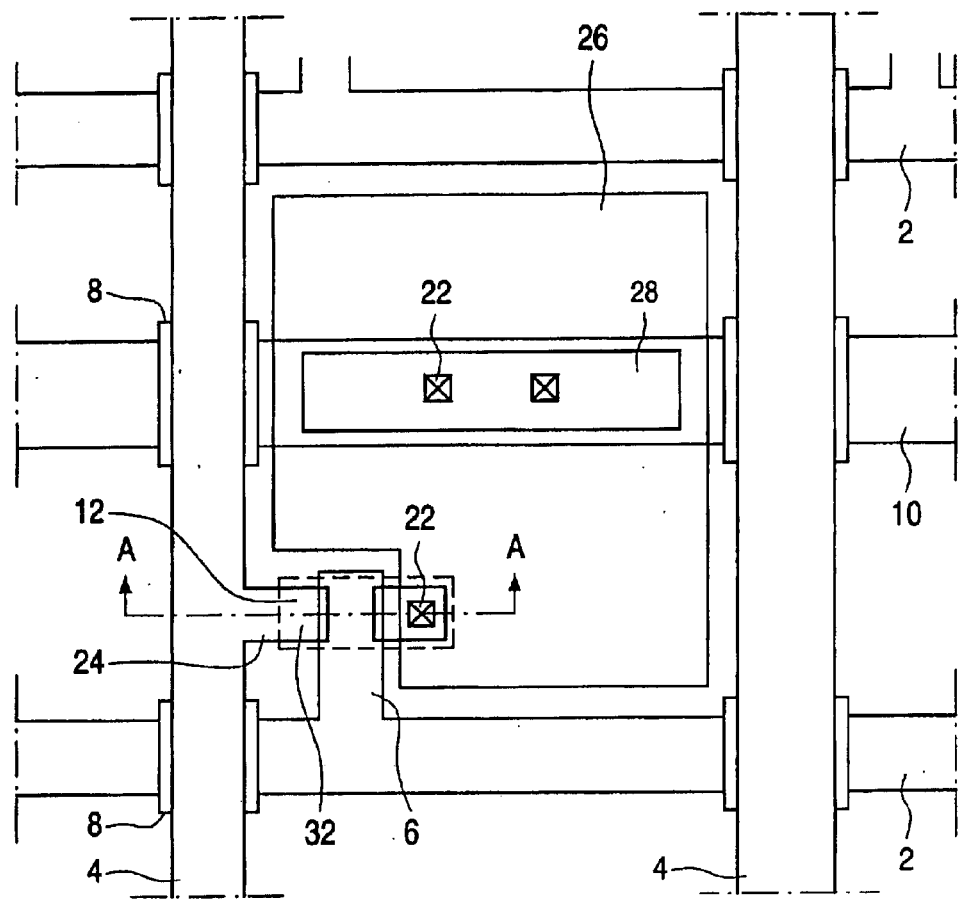
FIG. 1 is a top view of a conventional active matrix liquid crystal display.
Figure 2:
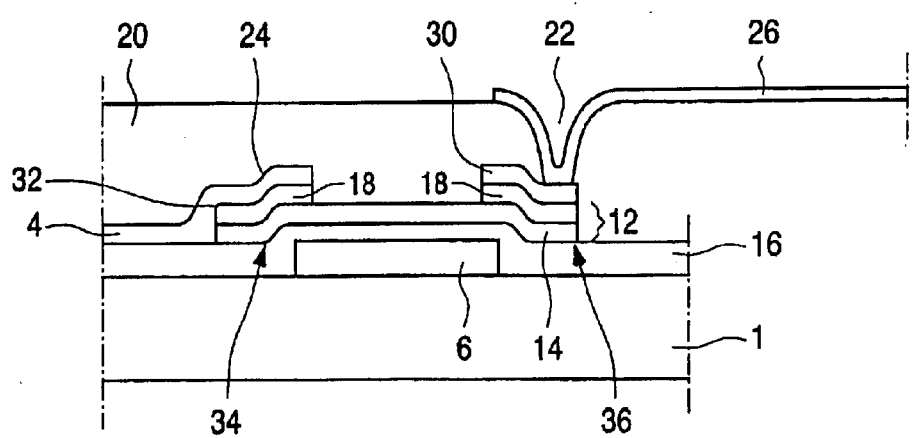
FIG. 2 shows a section through the thin film transistor in the arrangement of FIG. 1.
Figure 4:
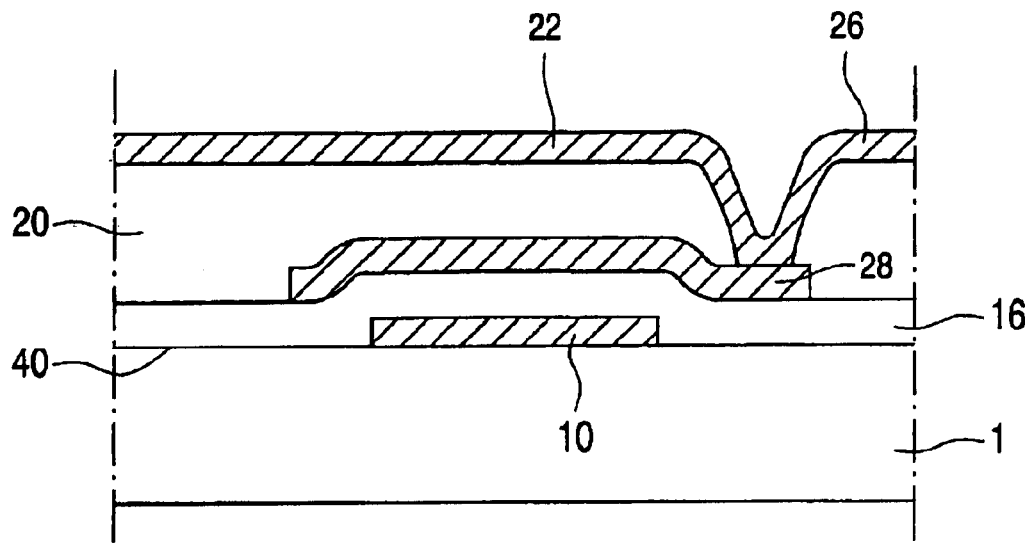
FIG. 4 is a side section through B—B of the embodiment shown in FIG. 3e.

The method of manufacturing an active plate according to the exemplary embodiment begins with a substrate 1. The substrate is made of a transparent material, such as glass, with an upper surface 40, which may, as shown, be substantially flat.

A first metallisation layer 2,10 is printed on the surface 40 of the substrate 1. The metallisation layer 2,10 defines a plurality of row electrodes 2 that extend across the substrate, and a plurality of storage capacitor lines 10 that likewise extend across the substrate parallel to the row electrodes 2. For clarity, only one row electrode 2 and one storage capacitor line 10 are shown in FIG. 3 but it will be appreciated that a number of row electrodes 2 and storage capacitor lines 10 may be provided to make an array.

The first metallisation layer 2,10 is printed in a single offset printing operation that prints across the substrate in a row direction 42 parallel to the row electrodes 2. Both the row 2 and capacitance 10 electrodes are of substantially constant width in the area of the array used for the display. Any tails 44 which occur at the end of the row 2 and capacitance 10 electrodes occur outside the area of the display and accordingly have little effect.

A gate dielectric layer 16 of silicon nitride is then formed over the whole of the substrate 1.

Next, semiconductor islands 12 are formed. These are formed by depositing a layer of intrinsic amorphous silicon 14 (i a-Si:H) and then a layer of doped amorphous silicon 18 (n+a-Si:H). Each layer is printed using a mask of the same form. The semiconductor islands 12 are arranged longitudinally over the row electrodes and are rectangular in form, with the long sides of the rectangles 12 parallel to the row electrodes 2, i.e. along the row direction 42. The printing is carried out in the row direction 42. The regions 6 of the row electrodes 2 under the semiconductor islands 12 act as gate electrodes.

The next step is to provide a second metallisation layer 4,28,30,46. This is deposited over the whole substrate and then patterned using conventional photolithography. The metallisation layer forms column electrodes 4 which extend across the substrate in a direction perpendicular to the row electrodes 2 and parts of which constitute source contacts 32. Fingers 46 extend from the column electrodes round the drain electrode to form a further source contact 32. The second metallisation layer also forms a drain electrode 30. The column electrodes 4, the fingers 46 and the drain electrode 30 extend across the semiconductor island 12 perpendicularly to the row direction 42.

The metallisation layer 4,28,30,46 is also used to form the top electrodes 28 of the storage capacitor 48. The form of the top electrodes is a plurality of fingers 50 extending across the width of the gate electrode joined together by a plurality of longitudinal elements 52 to connect the top electrode 28 together. The width of the fingers 50 where they extend over the first electrode is substantially the same as the width of the drain electrode 30 where the drain electrode 30 extends over the gate electrode 2 and the semiconductor island 12.

Some or all of the fingers 50 of the second storage electrode 28 may also extend in different directions, not laterally across the first storage capacitor electrode 10, but, for example, longitudinally in the row direction 42 or obliquely.

It is not essential that the fingers 50 in the second metallisation layer 4,28,30,46 across the storage capacitor are connected together by longitudinal elements 52; any suitable electrical connection may be used. For example, the connection may be through separate vias 22 corresponding to each finger. The vias 22 may connect to a conductor in another layer, conveniently the pixel electrode 26.

The insulating layer 16 acts as the capacitor dielectric between the top electrodes 28 and the storage capacitor lines 10.

The second metallisation layer 4,30,46 is then used as an etch mask to carry out a back-channel etching step to etch away the doped amorphous silicon layer 18 except under the second metallisation layer 4,30, 46. This leaves the intrinsic amorphous silicon layer 14 over the row electrodes 2 to form the channels of thin film transistors. The regions 6 of the row electrodes 2 under the semiconductor island form the gates of the thin film transistors. In this way the channel length of the thin film transistors is defined by the higher definition patterning method of photolithography instead of the lower definition method of printing. The arrangement of layers, and especially the simple form of the semiconductor island and row electrodes, means that inaccuracies in the definition of the semiconductor island and row electrodes are less critical than with conventional array structures.

A passivation layer 20 is then formed over the whole of the substrate, for example by a lower definition process, such as printing. A contact hole mask is then printed and used to etch vias 22 above the top electrode 28 of the capacitor and the drain 30. The passivation layer 20 is of silicon nitride. Other materials may be used, such as polymer material. The contact hole mask is then removed, as is known.

Pixel electrodes 26, for example of indium tin oxide (ITO), are then printed over the passivation layer 20 to complete the active plate. The printing direction is perpendicular to the row direction 42. The gap between the pixel electrode 26 and adjacent row electrodes 2 is sufficient that trailing hairs 44 from the pixel electrodes do not overlap the adjacent row electrodes 2.

The kick-back voltage is proportional to the product of the change in gate voltage at the end of the addressing pulse and the ratio of the gate-drain capacitance to the total pixel capacitance, i.e. the storage capacitance plus the liquid crystal capacitance (between active and passive plates) plus the gate-drain capacitance.

Any process variation resulting in a slight increase or decrease of the width of the drain electrode 30 will tend to result in a corresponding slight increase or decrease in the width of the fingers 50, since both features are part of the second metallisation layer and patterned together. By "width" is meant in each case the size of the electrode in a plane parallel to the substrate and substantially normal to the direction in which the electrode extends. If the second capacitor electrode 28 or the drain electrode 30 extends laterally across the width of the first capacitor electrode 10 or the gate electrode 2, respectively, then the width will be measured in the row direction 42.

An increase or decrease in the gate-drain capacitance will therefore be matched by a corresponding increase or decrease in the storage capacitance. Thus, the structure proposed tends to reduce process variation in the kick back voltage caused by variation in the width of features formed in the second metallisation layer.

Further, the top electrode 28 overlaps the edges of the lower storage capacitor electrode 10. In this way, if the width of the row electrode 2 and the capacitor electrode 10 is a little larger or smaller than the nominal, designed value, the capacitance of the storage capacitor will increase, but so will the gate-drain capacitance of the TFT. Again, the kick-back voltage will tend to vary much less with process variation, this time a variation in the width of the first metallisation layer.

The approach described is a development of the approach described in copending patent application GB0105145.7 to Philips (our ref. PHGB10030), which is incorporated herein by reference. In the approach of the copending application, a five layer patterning process is used to define the layers of an active plate. The design of the layers is different to that conventionally used in order that it is only necessary to pattern one layer, the layer used for the source and drain metallisations, using a high accuracy process such as photolithography. The other layers can be patterned using a low definition process, for example printing.

It should be noted that the reduction in variability of the kick-back voltage is not dependent on the particular form of the gate electrode 6. For example, the invention may also be used in arrangements where the gate electrode 6 is in the form of a spur extending laterally from row electrodes 2.

Nevertheless, the use of a row electrode 2 as the gate electrode 6 with a semiconductor body 12, thereon does permit the structure to be manufactured more easily using lower definition patterning processes.

FIG. 5 illustrates a number of possible shapes of the second electrode 28 of the storage capacitor. In the embodiments described the second metallisation layer 4, 28, 30, 46 defining the drain electrode 30 and patterned to provide the second storage capacitor electrode 28 having a plurality of fingers 50 is provided above the first metallisation layer 2,10. However, the invention is also applicable in arrangements where the second metallisation layer 4, 28, 30,46 is provided under the first metallisation layer 2,10.

Figures 5A, 5B, 5C, 5D:
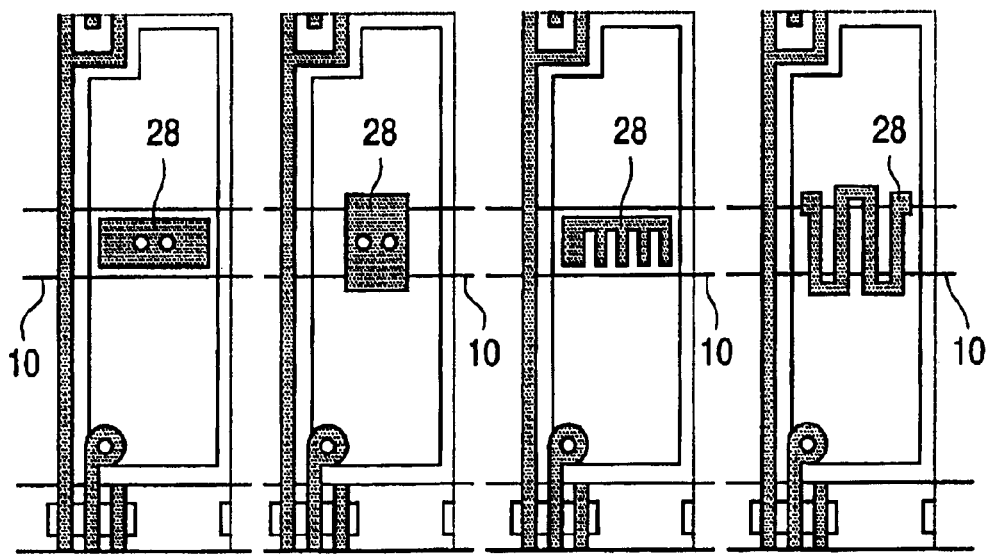
FIGS. 5a to 5d are detailed views of forms of a capacitor electrode according to the invention and in a comparative example.

FIG. 5a illustrates the arrangement described in the previously mentioned co-pending application, in which the second electrode 28 is wholly above and within the area of the first storage capacitor electrode 10.

In the comparative example of FIG. 5b, in contrast, the second capacitor. electrode 28 overlaps the edges of the lower capacitor electrode 10. In this way, when the top storage capacitor electrode 28 is broader than nominal, as a result of process variation, the width of the gate electrode tends to be likewise broader. Thus, the capacitance of the storage capacitor 48 and the parasitic gate drain capacitance of the TFT vary in parallel, and any variation in the kickback voltage is reduced. Calculations have shown that the design using this capacitor has only 40% of the sensitivity to variations in the metallisation layer width of the gate electrode 2 and the lower capacitor electrode 10 compared with that shown in FIG. 5a.

The design shown in FIG. 5c, in accordance with the invention, has less sensitivity to variation in the width of the second metallisation layer 4,28,30,46 that forms the column electrodes 4, the drain electrode 30 and the second electrode 28 of the storage capacitor 48. Variation in the width of the drain electrode 30 is matched in the second storage electrode 28 of the gate capacitor, so the gate-drain and storage capacitances tend to vary in parallel. Modelling suggests that this arrangement can very substantially reduce the sensitivity of the kickback voltage to variations in the width of the features in the second metallisation layer 4,28,30,46.

FIG. 5d illustrates an arrangement in accordance with the invention which combines both of the benefits of FIG. 5b and c. In this case, the storage capacitor 48 design reduces the effect of variation in the width of both the first 2,10 and second 4,28,30,46 metallisation layers.

Figure 6:
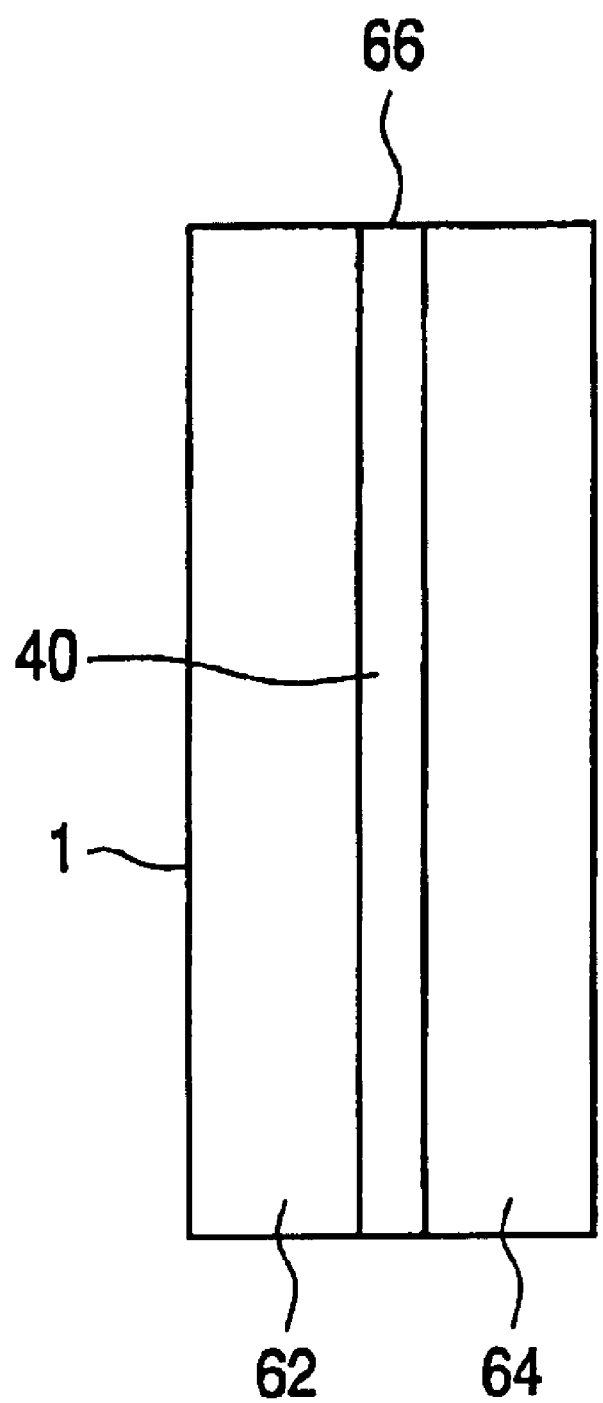
FIG. 6 is a schematic side section of a liquid crystal device according to the invention.

FIG. 6 illustrates a schematic section through a liquid crystal display having an active plate 62, a passive plate 64 and liquid crystal between the active and passive plates. The skilled person will be familiar with the manufacture of liquid crystal display devices from active plates in this way.

The invention is not limited to the arrangement shown. In particular, although the invention has been described with a particular form of thin film transistor and capacitor, the invention is applicable to other forms of active plates having a storage capacitor and thin film transistors. One example application where the approach of the invention may be suitable is in the manufacture of large image sensors, e.g. industrial X-ray detectors, which may have TFTs integrated with storage capacitors, Further modifications may be made to the details of the embodiments described. For example, the substrate may be opaque and the plate may operate on reflective light. In this case, the pixel electrode need not be transparent.

In a further modification, some or all of the layers may be formed by covering the substrate with the material of the layer, printing a resist pattern onto the material and etching away the material where not required to pattern the layer. The use of printed resist avoids the need to process photoresist with photolithography techniques. In this way a lower cost printing technique may be used for patterning without needing to directly print the layer used.

The invention is not restricted to the manufacture of bottom-gated structures such as that described above, but is also applicable to the manufacture of top-gated structures. As the skilled person will appreciate, the order of the layers will determine the order of the manufacturing steps. For example, for a bottom gated structure the row electrodes forming the gate may be deposited and patterned followed by the gate insulation layer followed by the semiconductor regions and then the source and drain metallisations. Conversely, in order to form a top-gated structure the row electrodes defining the gate may be defined after the source and drain metallisations, the semiconductor layer and gate insulator are deposited.

The described embodiment uses photolithography as the higher resolution process and printing as the lower resolution process. However, the invention is also applicable to other sets of processes. For example, the lower resolution process used for most of the layers may be a lower resolution photolithography process for example using a contact aligner, and for the higher resolution process a projection aligner may be used. Alternatively, a contact aligner may be used as the higher resolution process, with printing used as the lower resolution process.

Furthermore, it is not necessary to limit the number of processes to two. For example, it may be convenient to pattern one layer using one lower definition process and another layer using a different lower definition process.

The invention may also be applied with a variety of semiconductor technologies. The amorphous silicon layer described may be replaced by any of a number of semiconductor types. Examples include polysilicon, organic semiconductors, II–VI semiconductors such as CdTe, III–V semiconductors such as GaAs, and others.

The metallisation layers may be of aluminium, copper, or any convenient conductor, not necessarily metal.

From reading the present disclosure, other variations and modifications will be apparent to persons skilled in the art. Such variations and modifications may involve equivalent and other features which are already known in the design, manufacture and use of electronic devices comprising thin-film circuits, semiconductor devices, and component parts thereof, and which may be used instead of or in addition to features already described herein.

Although claims have been formulated in this Application to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. Features which are described in the context of separate embodiments may also be provided in combination in a single embodiment. Conversely, various features which are, for brevity, described in the context of a single embodiment, may also be provided separately or in any suitable subcombination. The Applicants hereby give notice that new claims may be formulated to such features and/or combinations of such features during the prosecution of the present Application or of any further Application derived therefrom.

What is claimed is:

1. A method of manufacture of an active plate, comprising the steps of:

depositing and patterning, using a lower definition patterning process, a first metallization layer on a substrate, the first metallization layer defining gate electrodes and first storage capacitor electrodes extending longitudinally across the substrate;

depositing an insulation layer;

depositing and patterning, using a lower definition patterning process, a semiconductor body layer forming thin film transistor bodies; and depositing and patterning, using a higher definition process, a second metallization layer defining source and drain electrodes and second storage capacitor electrodes, wherein the second storage capacitor electrode is patterned to have a plurality of separate fingers extending across the first storage capacitor electrode.

2. A method according to claim 1 wherein the drain electrode is patterned to extend across the gate electrode.

3. A method according to claim 1 wherein the higher definition process is photolithography and the lower definition process is printing.

4. A method of manufacture of an active plate, comprising:

depositing and patterning a first metallization layer on a substrate using a lower definition patterning process, the first metallization layer defining gate electrodes and first storage capacitor electrodes extending longitudinally across the substrate;

depositing an insulation layer;

depositing and patterning a semiconductor body layer forming thin film transistor bodies; and depositing and patterning a second metallization layer defining source and drain electrodes and second storage capacitor electrodes using a higher definition process;

wherein the second storage capacitor electrode is patterned to have a plurality of separate fingers extending across the first storage capacitor electrode.

5. The method of claim 4, wherein the drain electrode is patterned to extend across the gate electrode.

6. The method of claim 4, wherein the higher definition process is photolithography and the lower definition process is printing.

7. The method of claim 4, wherein the plurality of fingers of the second storage capacitor electrode extend laterally across the first storage capacitor electrode.

8. The method of claim 4, wherein a width of the fingers is in the range from half to double a width of the drain electrode.

9. The method of claim 4, wherein the second metallization layer defines at least one element electrically connecting together the fingers of the second storage capacitor electrode.

10. The method of claim 4, wherein the semiconductor body extends longitudinally over the gate electrode.

11. The method of claim 4, wherein the gate electrodes extend longitudinally across the substrate with substantially constant width.

12. A method for manufacturing a liquid crystal display, comprising:

manufacturing an active plate by the method of claim 4, disposing a passive plate opposite the active plate, and disposing liquid crystal between the active and passive plates.

* * * * *